(12) United States Patent
Lin et al.

(10) Patent No.: US 12,259,626 B1
(45) Date of Patent: Mar. 25, 2025

(54) LIQUID CRYSTAL PHASE-SHIFTING UNIT AND ANTENNA MODULE COMPRISING THE SAME

(71) Applicant: NATIONAL SUN YAT-SEN UNIVERSITY, Kaohsiung (TW)

(72) Inventors: Tsung-Hsien Lin, Kaohsiung (TW); Tien-Lun Ting, Kaohsiung (TW)

(73) Assignee: NATIONAL SUN YAT-SEN UNIVERSITY, Kaohsiung (TW)

( * ) Notice: Subject to any disclaimer, the term of this patent is extended or adjusted under 35 U.S.C. 154(b) by 0 days.

(21) Appl. No.: 18/588,040

(22) Filed: Feb. 27, 2024

(30) Foreign Application Priority Data

Jan. 18, 2024 (TW) ................. 113102061

(51) Int. Cl.
  *G02F 1/139* (2006.01)
  *G02F 1/1343* (2006.01)
  *G02F 1/137* (2006.01)

(52) U.S. Cl.
  CPC ........ *G02F 1/1391* (2013.01); *G02F 1/13439* (2013.01); *G02F 1/13706* (2021.01); *G02F 1/13712* (2021.01)

(58) Field of Classification Search
  None
  See application file for complete search history.

(56) References Cited

U.S. PATENT DOCUMENTS

| | | | | |
|---|---|---|---|---|
| 4,529,271 A | * | 7/1985 | Berreman | G09G 3/3629 349/175 |
| 5,627,666 A | * | 5/1997 | Sharp | G02F 1/141 349/98 |
| 6,649,087 B1 | * | 11/2003 | Dultz | G02F 1/141 252/299.01 |
| 2012/0257123 A1 | * | 10/2012 | Lee | G02F 1/13737 349/1 |
| 2019/0319325 A1 | * | 10/2019 | Zhang | H01P 11/00 |
| 2021/0336312 A1 | * | 10/2021 | Lu | H01P 1/18 |
| 2023/0031864 A1 | * | 2/2023 | Lin | G02F 1/133738 |
| 2023/0221607 A1 | * | 7/2023 | Cao | G02F 1/133514 342/371 |

FOREIGN PATENT DOCUMENTS

| | | | | | |
|---|---|---|---|---|---|
| CN | | 112436246 A | * | 3/2021 | ............. G02F 1/133 |
| WO | WO-2021163296 A1 | * | 8/2021 | ......... G02B 27/0093 |

* cited by examiner

*Primary Examiner* — Ryan Crockett
(74) *Attorney, Agent, or Firm* — WPAT, PC

(57) ABSTRACT

A liquid crystal phase-shifting unit includes a first conductive substrate, a second conductive substrate disposed parallel to the first conductive substrate, and a liquid crystal layer disposed between the first conductive substrate and the second conductive substrate. A distance between the first conductive substrate and the second conductive substrate is defined as a liquid crystal cell thickness, which is less than or equal to 5 μm. The liquid crystal layer includes a cholesteric liquid crystal, which has a pitch. The ratio of the liquid crystal cell thickness to the pitch is greater than or equal to 1. An antenna module including the liquid crystal phase-shifting unit is also provided.

9 Claims, 5 Drawing Sheets

LIQUID CRYSTAL PHASE-SHIFTING UNIT AND ANTENNA MODULE COMPRISING THE SAME

CROSS REFERENCE TO RELATED APPLICATION

The application claims the benefit of Taiwan application serial No. 113102061, filed on Jan. 18, 2024, and the entire contents of which are incorporated herein by reference.

BACKGROUND OF THE INVENTION

1. Field of the Invention

The present invention relates to a phase-shifting unit and, more particularly, to a liquid crystal phase-shifting unit using a bistable cholesteric liquid crystal, and an antenna module including the liquid crystal phase-shifting unit.

2. Description of the Related Art

A phase shifter is a device capable of adjusting the phase of a wave. In recent years, liquid crystal phase shifters have been widely used in wireless communication and optical fields due to their advantages of light weight, easy integration and control by integrated circuits, and low manufacturing costs. The primary working principle of a liquid crystal phase shifter involves the variation of the orientation angle of liquid crystal molecules under the influence of an electric field. This variation alters the dielectric constant and capacitance of the liquid crystal layer, thereby changing the phase of an optical or electrical signal passing through the liquid crystal layer to achieve phase shifting.

However, the known liquid crystal phase shifters require a continuous application of voltage on both sides of the liquid crystal layer to maintain the liquid crystal molecules at a specific orientation angle. Nevertheless, the continuous application of voltage not only increases energy consumption but may also impact the device lifespan and stability.

In view of this, it is necessary to improve the known liquid crystal phase shifter, i.e., the known liquid crystal phase-shifting unit.

SUMMARY OF THE INVENTION

To solve the above problems, it is an objective of the present invention to provide a liquid crystal phase-shifting unit, which can reduce the energy consumption caused by continuous application of voltage.

It is another objective of the present invention to provide an antenna module, which can reduce the energy consumption caused by continuous application of voltage.

As used herein, the term "a", "an" or "one" for describing the number of the elements and members of the present invention is used for convenience, provides the general meaning of the scope of the present invention, and should be interpreted to include one or at least one. Furthermore, unless explicitly indicated otherwise, the concept of a single component also includes the case of plural components.

As used herein, the terms "coupling" and "coupled connection" is used to include direct or indirect electrical and/or signal connections, which may be selected by a person skilled in the art according to the needs of use.

A liquid crystal phase-shifting unit according to the present invention includes a first conductive substrate, a second conductive substrate disposed parallel to the first conductive substrate, and a liquid crystal layer disposed between the first conductive substrate and the second conductive substrate. A distance between the first conductive substrate and the second conductive substrate is defined as a liquid crystal cell thickness, which is less than or equal to 5 μm. The liquid crystal layer includes a cholesteric liquid crystal, which has a pitch. A ratio of the liquid crystal cell thickness to the pitch is greater than or equal to 1.

Therefore, the liquid crystal phase-shifting unit of the present invention, by using cholesteric liquid crystals as the liquid crystal molecules in the liquid crystal layer, can utilize the different alignments of the bistable cholesteric liquid crystals to provide varying capacitance values, and thus achieve the function of phase shifting. Due to the bistable property of the cholesteric liquid crystal, even when the voltage applied to the liquid crystal phase-shifting unit is removed, the liquid crystal molecules can still maintain a specific alignment, so that continuous application of voltage is not necessary. Moreover, by applying a specific liquid crystal cell thickness, the switching time between bistable states can be shortened and the required voltage can be reduced. Furthermore, by applying a specific ratio of liquid crystal cell thickness to cholesteric liquid crystal pitch, the bistable switching can be ensured. In summary, the liquid crystal phase-shifting unit can reduce energy consumption and improve device lifespan and stability, which are the effects of the present invention.

In an example, the cholesteric liquid crystal contains a nematic liquid crystal and a chiral molecule, and the nematic liquid crystal is a dual-frequency liquid crystal, a positive liquid crystal, or a negative liquid crystal doped with salt ions. Thus, different liquid crystal materials can be selected according to the needs, which can enhance the applicability.

In an example, the cholesteric liquid crystal is bistable with a planar state and a focal conic state. Thus, even when the voltage applied to the liquid crystal phase-shifting unit is removed, the liquid crystal molecules can still maintain a specific alignment, so that continuous application of voltage is not necessary, which can reduce energy consumption.

In an example, the first conductive substrate is electrically connected to a first electrode lead, the second conductive substrate is electrically connected to a second electrode lead, and the first electrode lead and the second electrode lead are respectively electrically connected to a voltage source. Thus, the magnitude or frequency of the applied voltage can be adjusted to change the alignment of liquid crystal molecules thus providing varying capacitance values, which can achieve the effect of phase shifting function.

In an example, the second electrode lead includes coplanar one signal line and two ground lines disposed on both sides of the signal line. Thus, the second electrode lead can be used to transmit signals.

In an example, a thickness of both the first conductive substrate and the second conductive substrate is greater than or equal to 1 μm. Thus, the function of the conductive substrate can be ensured, and the function of the liquid crystal phase-shifting unit can be improved.

In an example, a material of both the first conductive substrate and the second conductive substrate is copper, aluminum, gold, silver or an alloy thereof. Thus, the first conductive substrate and the second conductive substrate can be provided with high electrical conductivity and magnetic permeability, which can improve the function of the liquid crystal phase-shifting unit.

In an example, a material of both the first electrode lead and the second electrode lead is indium tin oxide, indium zinc oxide, indium tin zinc oxide, or nano silver wire. Thus, by using materials with high transparency and low electrical resistance as conductive materials, it has the effect of reducing energy losses.

An antenna module according to the present invention includes a plurality of antenna elements. Each antenna element includes the liquid crystal phase-shifting unit as described above used for phase shifting of signals, and a radiation unit coupled to the liquid crystal phase-shifting unit used for signal feed-in or feed-out.

Therefore, the antenna module of the present invention, by using the liquid crystal phase-shifting unit as described above, can reduce energy consumption and improve device lifespan and stability, which are the effects of the present invention.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
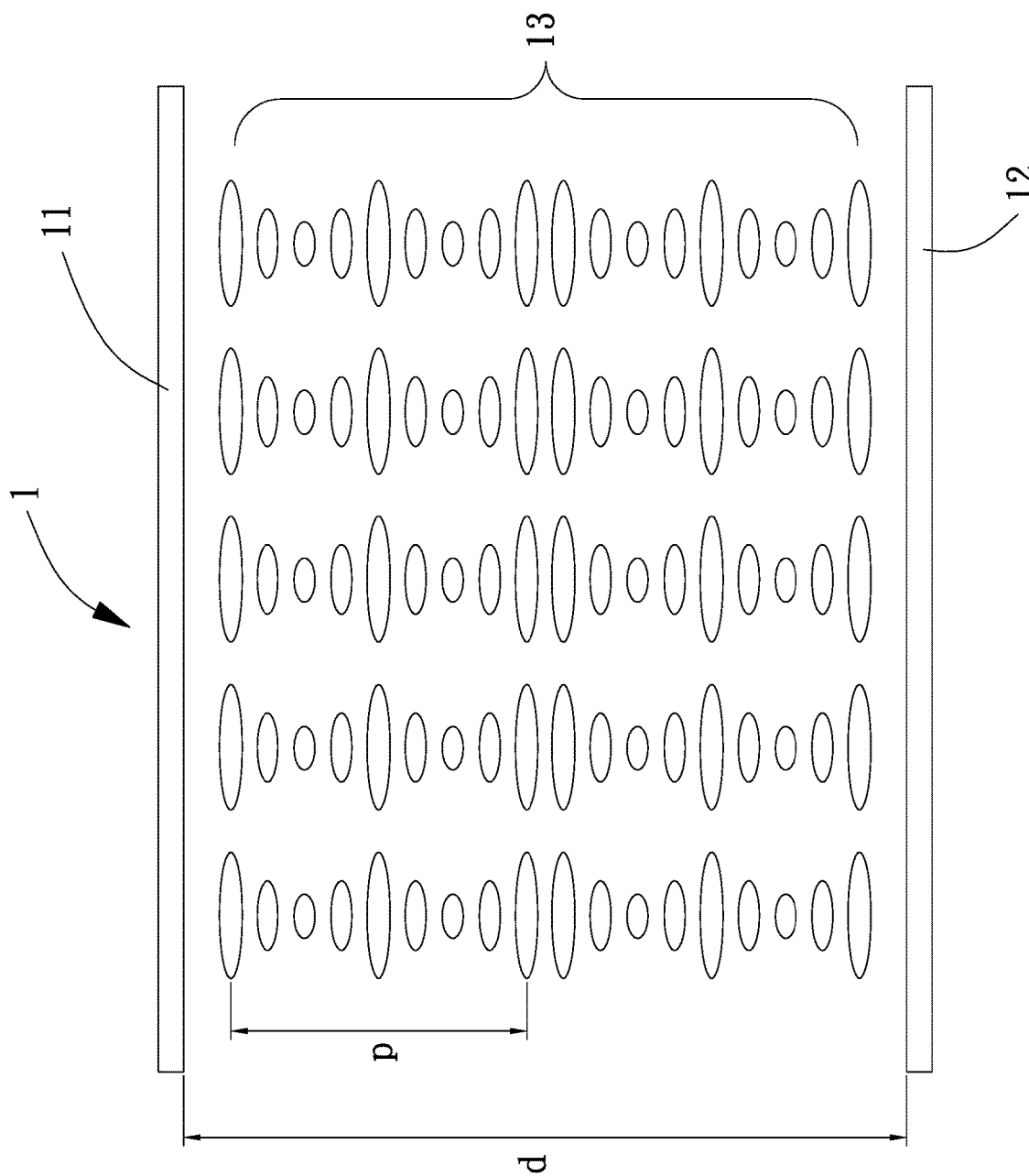
FIG. 1 is a schematic diagram of a structure of the liquid crystal phase-shifting unit of the present invention.

When the terms "front", "rear", "left", "right", "up", "down", "top", "bottom", "inner", "outer", "side", and similar terms are used herein, it should be understood that these terms have reference only to the structure shown in the drawings as it would appear to a person viewing the drawings and are utilized only to facilitate describing the invention, rather than restricting the invention.

DETAILED DESCRIPTION OF THE INVENTION

In order to make the above and other objectives, features, and advantages of the present invention clearer and easier to understand, preferred embodiments of the present invention will be described hereinafter in connection with the accompanying drawings. Furthermore, the elements designated by the same reference numeral in various figures will be deemed as identical, and the description thereof will be omitted.

Referring to FIG. 1, it is a schematic diagram of the liquid crystal phase-shifting unit 1 of the present invention. It should be noted that the dimensions shown in the diagram are for illustration purposes only and do not represent the actual conditions. The liquid crystal phase-shifting unit 1 includes a first conductive substrate 11, a second conductive substrate 12 and a liquid crystal layer 13. The first conductive substrate 11 and the second conductive substrate 12 are separated from each other and disposed in parallel. A distance between the first conductive substrate 11 and the second conductive substrate 12 is defined as a liquid crystal cell thickness d. The liquid crystal layer 13 is interposed between the first conductive substrate 11 and the second conductive substrate 12.

The first conductive substrate 11 and the second conductive substrate 12 may be respectively electrically connected to an electrode lead (not shown in FIG. 1), and respectively electrically connected to a voltage source by the electrode lead. The voltage source can provide a pulsed voltage, thereby forming a variable capacitor with the first conductive substrate 11 and the second conductive substrate 12 as parallel plates and the liquid crystal molecules in the liquid crystal layer 13 as dielectrics. Moreover, based on the variation of the magnitude or frequency of the pulse voltage, the alignment of the liquid crystal molecules in the liquid crystal layer 13 can be changed (as described later), thereby changing the capacitance value of the liquid crystal layer 13. By changing the capacitance value of the liquid crystal layer 13, the phase of the optical or electrical signals passing through the liquid crystal layer 13 can be changed, thereby achieving the phase shift function.

A material of both the first conductive substrate 11 and the second conductive substrate 12 may be metallic materials with high conductivity and magnetic permeability, including but not limited to copper, aluminum, gold, silver, and other metals or an alloy thereof. A thickness of both the first conductive substrate 11 and the second conductive substrate 12 may be greater than or equal to 1 μm, so as to achieve high transparency as well as to reduce electrical resistance by decreasing the cross-sectional area.

A material of the electrode leads may be transparent conductive oxides such as indium tin oxide (ITO), indium zinc oxide (IZO), indium tin zinc oxide (ITZO), or transparent conductive metals such as nano silver wire. However, the present invention is not limited to these materials. By using materials with high transparency and low electrical resistance as conductive materials, the effect of reducing energy losses can be achieved.

The liquid crystal layer 13 includes a cholesteric liquid crystal, which is formed by mixing a nematic liquid crystal and a chiral molecule. The nematic liquid crystal may be a dual-frequency liquid crystal, a positive liquid crystal, or a negative liquid crystal doped with salt ions. Therefore, different liquid crystal materials can be selected according to the needs and the applicability of the liquid crystal phase-shifting unit can be enhanced.

The cholesteric liquid crystal has a periodic helical structure with a pitch p. It should be understood by a person skilled in the art that the pitch p herein is defined as the length along which the director axis of the liquid crystal molecules completes a full rotation ($2\pi$) around the helical axis.

Figure 2:
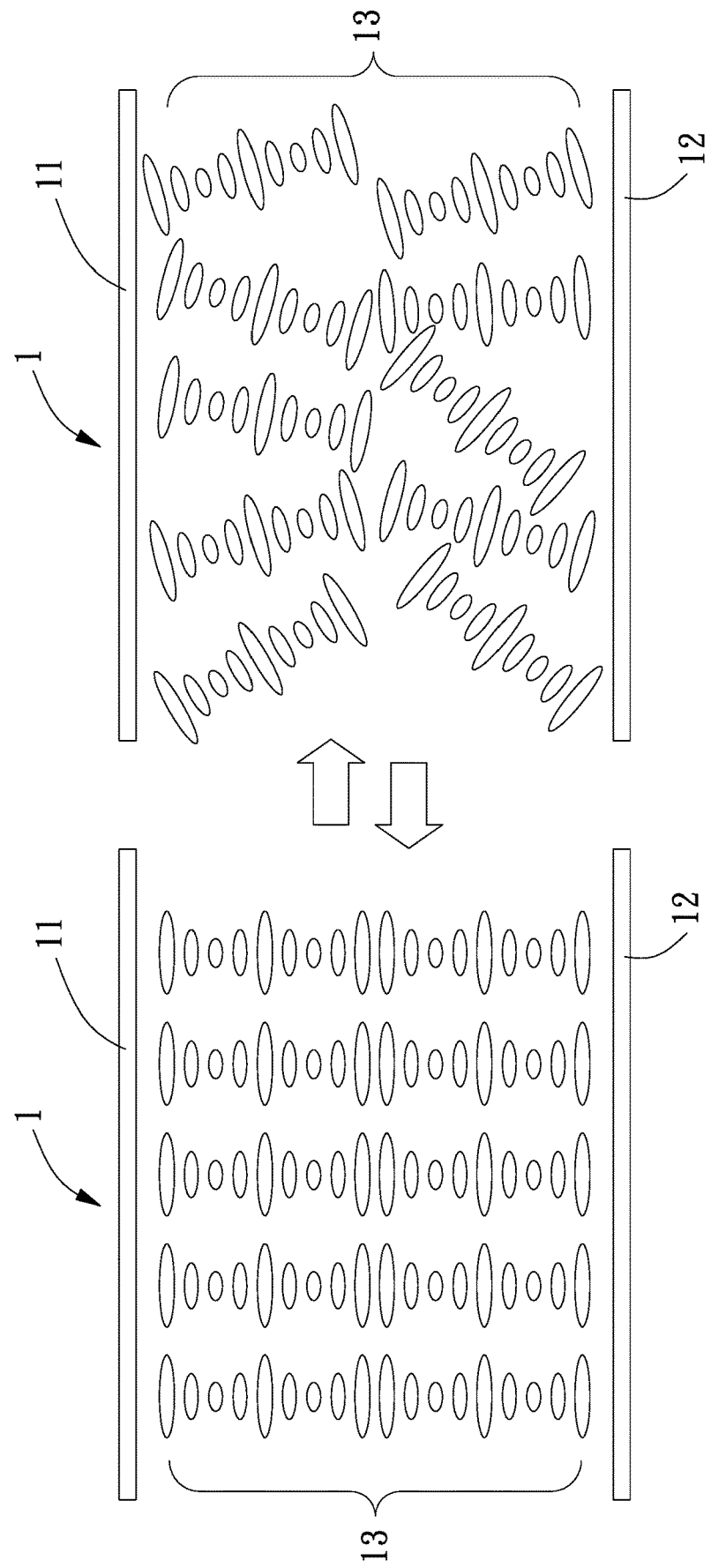
FIG. 2 is a schematic diagram of the alignments of cholesteric liquid crystals in bistable states.

The cholesteric liquid crystal is bistable with a planar state and a focal conic state. Referring to FIG. 2, as shown in the planar state on the left side of FIG. 2, the helical axes of the cholesteric liquid crystal molecules are perpendicular to the first conductive substrate 11 and the second conductive substrate 12 respectively on upper and lower sides of the liquid crystal layer 13. At this state, the liquid crystal layer 13 can reflect specific wavelengths of light through Bragg reflection property. In the focal conic state on the right side of FIG. 2, the helical axes of the cholesteric liquid crystal molecules exhibit a random alignment, which results in a scattering property. In comparison to the planar state, the reflectance is lower in the focal conic state. Therefore, the alignment state of cholesteric liquid crystal can be determined by measuring parameters such as reflectance and haze values.

Different alignments of the above bistable states will affect the capacitance value of the liquid crystal layer 13, which can be represented by the following equation:

$$C_{lc} = \left(\frac{A}{d}\right) \varepsilon_\perp \varepsilon_\parallel / (\varepsilon_\perp \cos^2\theta + \varepsilon_\parallel \sin^2\theta) \quad \text{(Equation 1)}$$

In the above equation 1, "A" represents the cross-sectional area of the parallel plates (i.e., the first conductive substrate 11 and the second conductive substrate 12); "d" represents the thickness of the liquid crystal layer 13 (i.e., the liquid crystal cell thickness d); "θ" represents the angle between the director axis of the liquid crystal molecules and the normal vector of the parallel plates; "ε∥" represents the permittivity in the direction parallel to the long axis of the liquid crystal molecules; and "ε⊥" represents the permittivity in the direction parallel to the short axis of the liquid crystal molecules. The above equation 1 indicates that the alignment of planar state or focal conic state also affects the capacitance value of the liquid crystal layer 13.

The liquid crystal phase-shifting unit 1 of the present invention can drive the cholesteric liquid crystal to switch between planar state and focal conic state by adjusting the magnitude or frequency of the pulse voltage applied by the voltage source. The above two stable states can provide varying capacitance values so that the liquid crystal phase-shifting unit 1 can have varying phase-shifting degrees and thereby achieving the function of phase shifting. Further, by using the cholesteric liquid crystal as the liquid crystal molecules in the liquid crystal layer 13, even after removing the pulse voltage, the liquid crystal molecules can still maintain a specific alignment in the planar state or the conical state due to the bistable property of the cholesteric liquid crystal. Therefore, the phase-shifting degree of the liquid crystal phase-shifting unit 1 can be maintained without continuously applying voltage to the liquid crystal phase-shifting unit 1, thereby reducing energy consumption and improving the device lifespan and stability.

For example, when a positive liquid crystal is used as the nematic liquid crystal, the cholesteric liquid crystal can be switched between the planar state and the focal conic state by applying voltages of different magnitudes. When a negative liquid crystal doped with salt ions is used as the nematic liquid crystal, the cholesteric liquid crystal can be switched between the planar state and the focal conic state by applying AC voltages of different frequencies. When a dual frequency liquid crystal is used as the nematic liquid crystal, the cholesteric liquid crystal can be switched between the planar state and the focal conic state by applying low-frequency AC voltages, and the focal conic state can be rapidly switched to the planar state by applying high-frequency AC voltages. In addition, the high frequency or low frequency herein is defined according to the crossover frequency of the liquid crystal molecules.

Referring to FIG. 1, in the liquid crystal phase-shifting unit 1 of the present invention, the liquid crystal cell thickness d can be less than or equal to 5 μm. Preferably, it can be greater than or equal to 1 μm and less than or equal to 5 μm. Thus, the switching time required for the cholesteric liquid crystal to switch from the planar state to the focal conic state can be shortened, and the switching time required for the cholesteric liquid crystal to switch from the focal conic state to the planar state also can be shortened. Moreover, when a positive liquid crystal is used as the nematic liquid crystal of the cholesteric liquid crystal, or when a dual-frequency liquid crystal or a negative liquid crystal doped with salt ions is used as the nematic liquid crystal of the cholesteric liquid crystal and a low-frequency voltage is applied, the voltage required to switch the cholesteric liquid crystal from the planar state to the focal conic state can be reduced, and the voltage required to switch the cholesteric liquid crystal from the focal conic state to the planar state also can be reduced.

Referring to FIG. 1, in the liquid crystal phase-shifting unit 1 of the present invention, a ratio (d/p) of the liquid crystal cell thickness d to the pitch p of the cholesteric liquid crystal can be greater than or equal to 1. Thus, it can be ensured that the cholesteric liquid crystal can switch from the planar state to the focal conic state. This is because when d/p is less than 1, the liquid crystal molecules are more affected by the substrate on both sides and tend to be aligned in a planar state, thus affecting the formation of the focal conic state.

Figure 3:
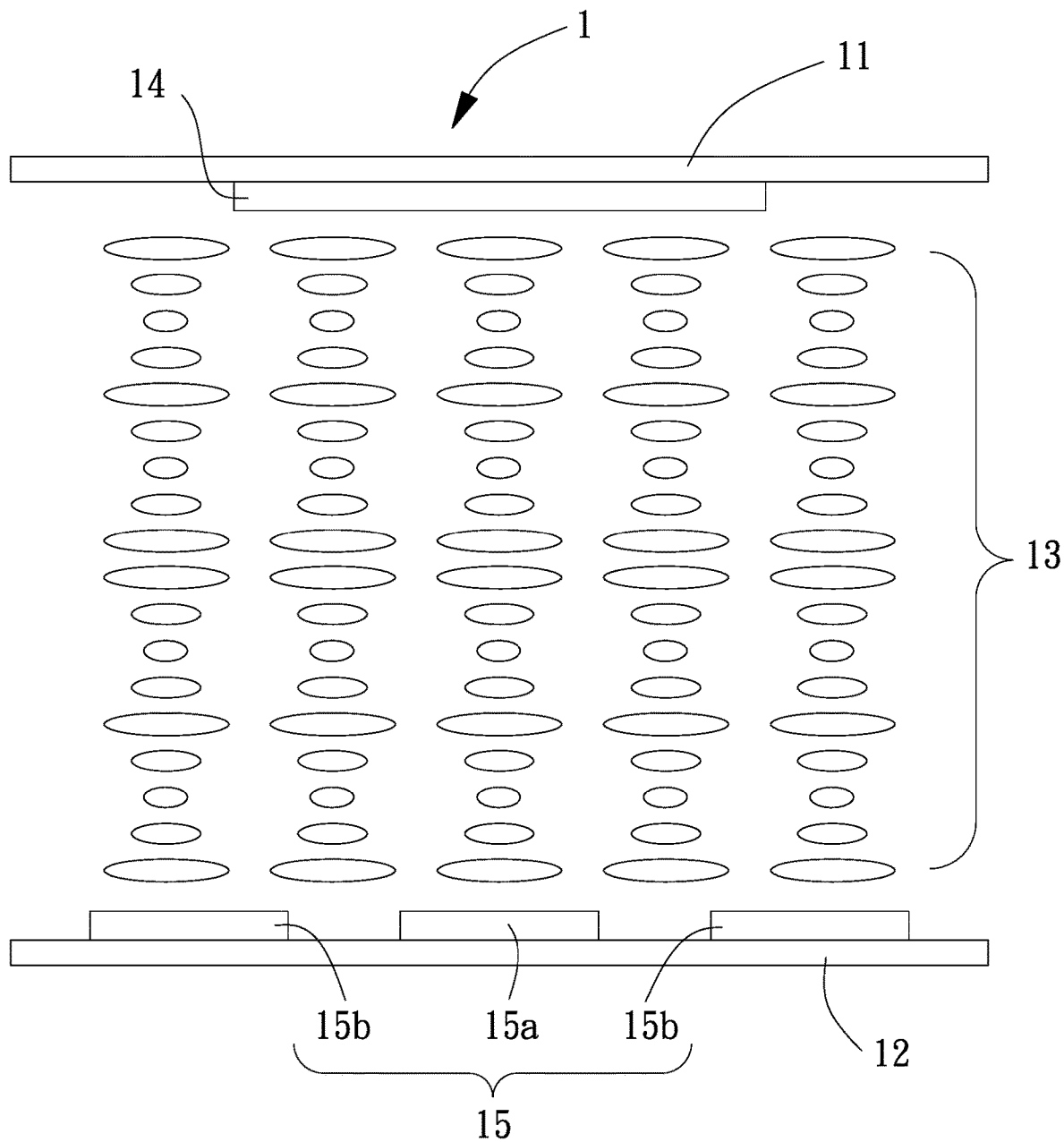
FIG. 3 is a schematic diagram of a structure of an embodiment of the liquid crystal phase-shifting unit of the present invention.

In an embodiment, as shown in FIG. 3, the first conductive substrate 11 may be electrically connected to a first electrode lead 14, which is disposed on a side of the first conductive substrate 11 close to the liquid crystal layer 13. The second conductive substrate 12 may be electrically connected to a second electrode lead 15, which is disposed on a side of the second conductive substrate 12 close to the liquid crystal layer 13. The first electrode lead 14 and the second electrode lead 15 are respectively electrically connected to a voltage source. The second electrode lead 15 may be a coplanar waveguide used for signal transmission. In detail, the second electrode lead 15 may include coplanar one signal line 15a and two ground lines 15b disposed on both sides of the signal line 15a. Thus, optical or electrical signals can be transmitted between the signal line 15a and the ground lines 15b.

It should be noted that in this embodiment, in addition to transmitting signals by the second electrode lead 15, which is a coplanar waveguide, it is also possible to control the alignment of the liquid crystal molecules in the liquid crystal layer 3 by adjusting the voltage applied between the first electrode lead 14 and the second electrode lead 15. By using a coplanar waveguide as the transmission line for signals, even with a relatively thinner liquid crystal cell thickness, the impedance will not become excessively high.

Figure 4:
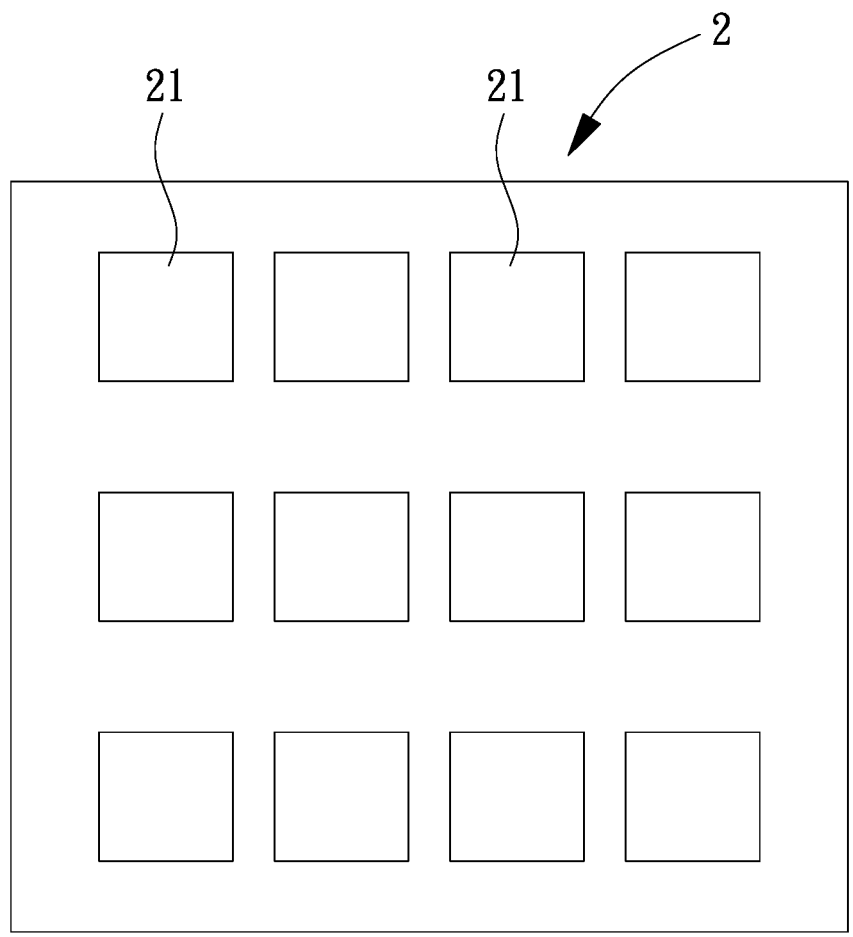
FIG. 4 is a schematic diagram of the antenna module of the present invention.

As shown in FIG. 4, the present invention may further include an antenna module 2, which may include a plurality of antenna elements 21. Each of the antenna elements 21 includes the liquid crystal phase-shifting unit 1 as described above and a radiation unit. In the antenna element 21, the liquid crystal phase-shifting unit 1 is used to change the phase of optical or electrical signals. The radiation unit is coupled to the liquid crystal phase-shifting unit 1 to radiate optical or electrical signals, achieving signal feed-in and feed-out. The antenna module 2 may further include a control circuit for controlling the voltage applied to the liquid crystal phase-shifting unit 1 in each antenna elements 21. The control circuit can be, for example, a driver circuit utilizing a thin-film transistor (TFT).

In FIG. 4, the plurality of antenna elements 21 in the antenna module 2 are arranged in an array. It should be noted that as long as the signal transmission or reception in a specific direction can be achieved by varying phase-shifting degree and spatial configurations of the plurality of antenna elements 21, the plurality of antenna elements 21 in the antenna module 2 can also be arranged in other manners, such as a circular arrangement or a honeycomb arrangement, and the present invention is not limited in this regard.

In order to prove that the specific range of the liquid crystal cell thickness d and the ratio d/p (the liquid crystal cell thickness d relative to the pitch p) limited by the liquid crystal phase-shifting unit 1 of the present invention can achieve the above effect, the following experiments were conducted respectively.

(I) Liquid Crystal Cell Thickness d

A positive liquid crystal was used as a nematic liquid crystal to prepare a cholesteric liquid crystal sample S with a pitch p of 300 nm. The cholesteric liquid crystal sample S has a higher reflectance to visible light in the planar state compared to the focal conic state. Then, the cholesteric liquid crystal sample S was used to prepare liquid crystal phase-shifting units with liquid crystal cell thickness d of 5 μm and 12 μm, respectively. Voltage was applied to the above liquid crystal phase-shifting units, and the relationship between voltage and visible light reflectance was measured to obtain the voltage required for the cholesteric liquid crystal sample S to switch between the planar state and the focal conic state. At the same time, the switching time between the bistable states is measured by the transmittance measurement system of red laser. The results are shown in FIG. 5 and Table 1.

TABLE 1

| Liquid crystal cell thickness d | Switching time from planar state to focal conic state | Switching time from focal conic state to planar state |
|---|---|---|
| 5 μm | 290 ms | 170 ms |
| 12 μm | 2500 ms | 800 ms |

Figure 5:
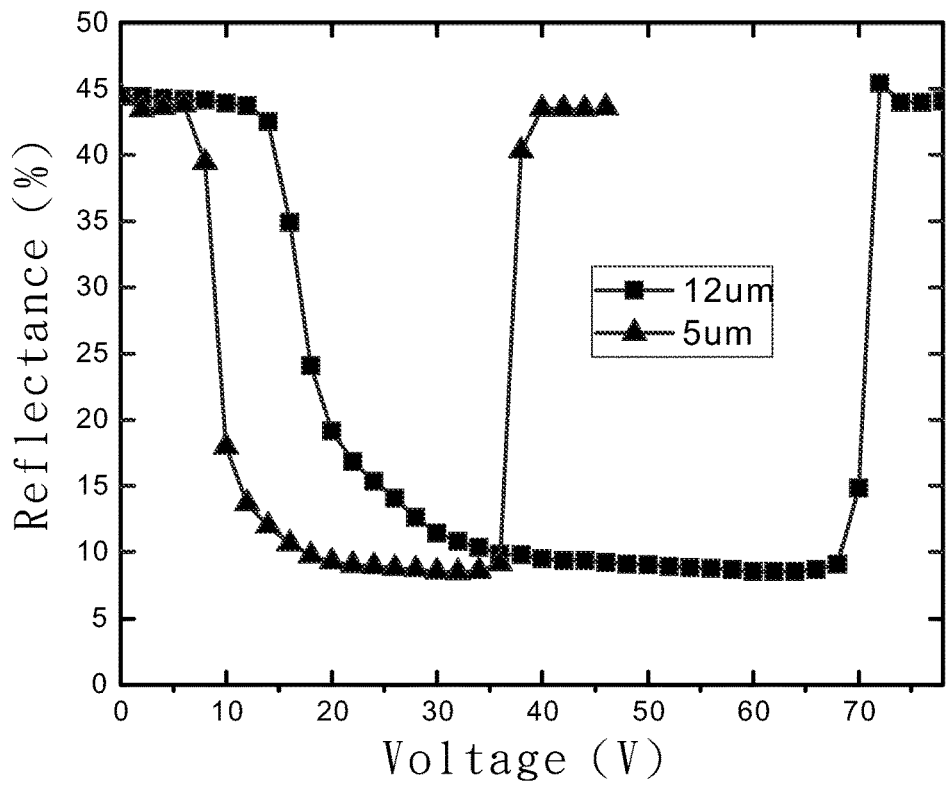
FIG. 5 shows the relationship between the voltage and reflectance of the liquid crystal phase-shifting unit of the present invention.

Based on the point at which the variation of reflectance stabilizes in FIG. 5, it can be observed that for the liquid crystal phase-shifting unit with a liquid crystal cell thickness d outside the range limited by the present invention (specifically, the liquid crystal cell thickness d is 12 μm), the transition from the planar state to the focal conic state occurs at an applied voltage of approximately 40 volts, and the transition from the focal conic state to the planar state occurs at an applied voltage of approximately 80 volts. In contrast, for the liquid crystal phase-shifting unit with a liquid crystal cell thickness d within the range limited by the present invention (specifically, the liquid crystal cell thickness d is 5 μm), the transition from the planar state to the focal conic state occurs at an applied voltage of approximately 20 volts, and the transition from the focal conic state to the planar state occurs at an applied voltage of approximately 40 volts. Thus, it can be concluded that the liquid crystal phase-shifting unit of the present invention can reduce the voltage required to switch the cholesteric liquid crystal between bistable states by setting the liquid crystal cell thickness d to be less than or equal to 5 μm.

In addition, according to the switching time measured in Table 1, it can be concluded that the liquid crystal phase-shifting unit of the present invention can shorten the time required for switching between bistable states of cholesteric liquid crystal by setting the liquid crystal cell thickness d to be less than or equal to 5 μm.

(II) Ratio of Liquid Crystal Cell Thickness to Pitch d/p

A positive liquid crystal was used as a nematic liquid crystal to prepare a cholesteric liquid crystal sample T with a pitch p of 2 μm. The cholesteric liquid crystal sample T in the focal conic state exhibits a scattering property, resulting in a higher haze value compared to the planar state. Then, the cholesteric liquid crystal sample T was used to prepare liquid crystal phase-shifting units with liquid crystal cell thickness d of 1.8 μm and 4.8 μm, i.e., liquid crystal phase-shifting units with d/p ratios of 0.9 and 2.4, respectively. Voltage was applied to the above liquid crystal phase-shifting units and the relationship between voltage and haze was measured. The results are shown in FIG. 6.

Figure 6:
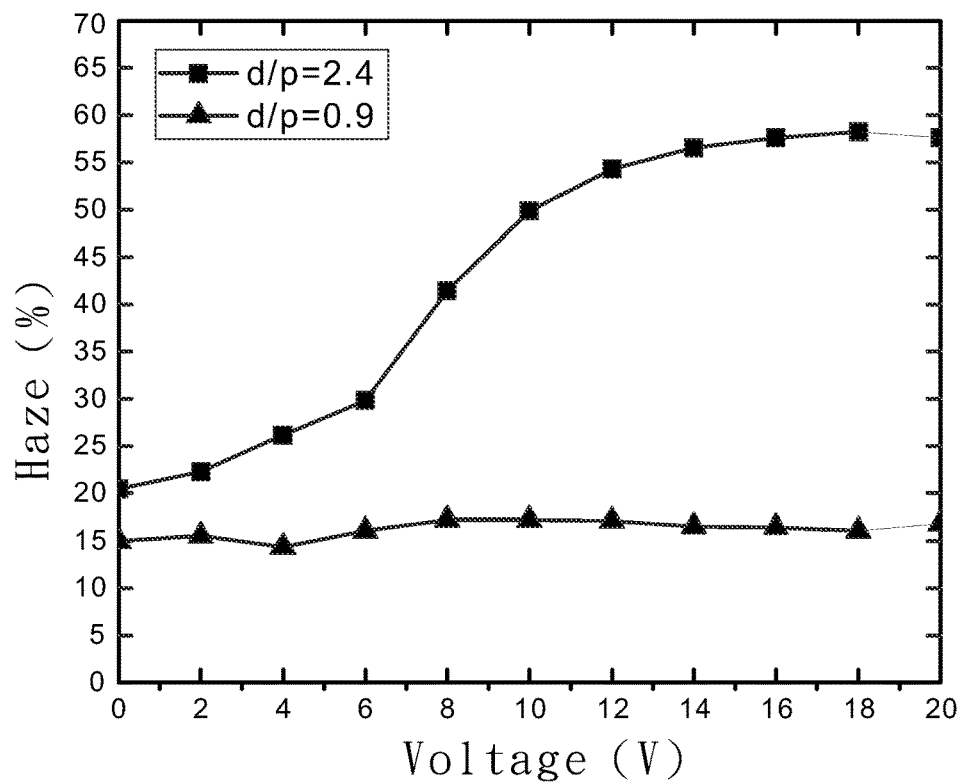
FIG. 6 shows the relationship between the voltage and haze value of the liquid crystal phase-shifting unit of the present invention.

Based on the variation in haze values in FIG. 6, it can be observed that the liquid crystal phase-shifting unit with a ratio d/p of liquid crystal cell thickness d to pitch p outside the range limited by the present invention (specifically, the d/p is 0.9) maintains a consistently lower haze value without significant change when a voltage of 0-20 volts is applied. In other words, the transition from the planar state to the focal conic state has not occurred. In contrast, for the liquid crystal phase-shifting unit with a ratio d/p of liquid crystal cell thickness d to pitch p within the range limited by the present invention (specifically, the d/p is 2.4), a significant variation in haze values can be observed. In other words, a transition from the planar state to the focal conic state has occurred. Thus, it can be concluded that the liquid crystal phase-shifting unit of the present invention can ensure the transition of the cholesteric liquid crystal from the planar state to the focal conic state by setting the ratio of liquid crystal cell thickness d to pitch p to be greater than or equal to 1.

In view of the forgoing, the liquid crystal phase-shifting unit of the present invention, by using cholesteric liquid crystals as the liquid crystal molecules in the liquid crystal layer, can utilize the different alignments of the bistable cholesteric liquid crystals to provide varying capacitance values, and thus achieve the function of phase shifting. Due to the bistable property of the cholesteric liquid crystal, even when the voltage applied to the liquid crystal phase-shifting unit is removed, the liquid crystal molecules can still maintain a specific alignment, so that continuous application of voltage is not necessary. Moreover, by applying a specific liquid crystal cell thickness, the switching time between bistable states can be shortened and the required voltage can be reduced. Furthermore, by applying a specific ratio of liquid crystal cell thickness to cholesteric liquid crystal pitch, the bistable switching can be ensured. In summary, the liquid crystal phase-shifting unit can reduce energy consumption and improve device lifespan and stability, which are the effects of the present invention.

Although the present invention has been described with respect to the above preferred embodiments, these embodiments are not intended to restrict the present invention. Various changes and modifications on the above embodiments made by any person skilled in the art without departing from the spirit and scope of the present invention are still within the technical category protected by the present invention. Accordingly, the scope of the present invention shall include the literal meaning set forth in the appended claims and all changes which come within the range of equivalency of the claims. Furthermore, in a case that several of the above embodiments can be combined, the present invention includes the implementation of any combination.

What is claimed is:

1. A liquid crystal phase-shifting unit, comprising:
a first conductive substrate;
a second conductive substrate disposed parallel to the first conductive substrate; and
a liquid crystal layer disposed between the first conductive substrate and the second conductive substrate;
wherein a distance between the first conductive substrate and the second conductive substrate is defined as a liquid crystal cell thickness, which is less than or equal to 5 μm, wherein the liquid crystal layer includes a cholesteric liquid crystal having a pitch, and wherein a ratio of the liquid crystal cell thickness to the pitch is equal to 2.4.

2. The liquid crystal phase-shifting unit as claimed in claim 1, wherein the cholesteric liquid crystal contains a nematic liquid crystal and a chiral molecule, and wherein the nematic liquid crystal is a dual-frequency liquid crystal, a positive liquid crystal, or a negative liquid crystal doped with salt ions.

3. The liquid crystal phase-shifting unit as claimed in claim 1, wherein the cholesteric liquid crystal is bistable with a planar state and a focal conic state.

4. The liquid crystal phase-shifting unit as claimed in claim 1, wherein the first conductive substrate is electrically connected to a first electrode lead, the second conductive substrate is electrically connected to a second electrode lead, and the first electrode lead and the second electrode lead are respectively electrically connected to a voltage source.

5. The liquid crystal phase-shifting unit as claimed in claim 4, wherein the second electrode lead includes coplanar one signal line and two ground lines disposed on both sides of the signal line.

6. The liquid crystal phase-shifting unit as claimed in claim 4, wherein a material of both the first electrode lead and the second electrode lead is indium tin oxide, indium zinc oxide, indium tin zinc oxide, or nano silver wire.

7. The liquid crystal phase-shifting unit as claimed in claim 1, wherein a thickness of both the first conductive substrate and the second conductive substrate is greater than or equal to 1 μm.

8. The liquid crystal phase-shifting unit as claimed in claim 1, wherein a material of both the first conductive substrate and the second conductive substrate is copper, aluminum, gold, silver or an alloy thereof.

9. An antenna module comprising a plurality of antenna elements, wherein each antenna element includes:

the liquid crystal phase-shifting unit as claimed in claim 1 used for phase shifting of signals; and a radiation unit coupled to the liquid crystal phase-shifting unit used for signal feed-in or feed-out.

* * * * *